(12) United States Patent
Imfeld et al.

(10) Patent No.: US 10,928,068 B2
(45) Date of Patent: Feb. 23, 2021

(54) ANNULAR HELMHOLTZ DAMPER FOR A GAS TURBINE CAN COMBUSTOR

(71) Applicant: ANSALDO ENERGIA SWITZERLAND AG, Baden (CH)

(72) Inventors: Jost Imfeld, Scherz (CH); Paul Marlow, Baden (CH)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 175 days.

(21) Appl. No.: 15/710,096

(22) Filed: Sep. 20, 2017

(65) Prior Publication Data
US 2018/0080652 A1 Mar. 22, 2018

(30) Foreign Application Priority Data

Sep. 22, 2016 (EP) ..................................... 16190213

(51) Int. Cl.
F23R 3/00 (2006.01)
F23R 3/16 (2006.01)
(Continued)

(52) U.S. Cl.
CPC .............. *F23R 3/16* (2013.01); *F23M 20/005* (2015.01); *F23R 3/002* (2013.01); *F23R 3/50* (2013.01);
(Continued)

(58) Field of Classification Search
CPC .............. F23R 2900/00014; F23R 3/46; F05D 2260/963; F23M 20/005; F02C 7/24
See application file for complete search history.

(56) References Cited

U.S. PATENT DOCUMENTS 6,351,947 B1 3/2002 Keller et al.
10,018,088 B2 7/2018 Eroglu
(Continued)

FOREIGN PATENT DOCUMENTS

CN 104565187 A 4/2015
CN 105008805 A 10/2015
(Continued)

OTHER PUBLICATIONS

European Search Report dated Feb. 23, 2017.
(Continued)

*Primary Examiner* — Craig Kim
*Assistant Examiner* — Alyson Joan Harrington
(74) *Attorney, Agent, or Firm* — Buchanan Ingersoll & Rooney PC (57) ABSTRACT

An annular Helmholtz damper for a gas turbine can combustor, the annular Helmholtz damper having an axis; an inner wall and an outer wall concentrically arranged with respect to the axis to define an annular damping volume arranged around a can combustor; a front and rear circumferential plates for closing the annular damping volume upstream and downstream; at least one intermediate circumferential plate arranged between the front and the rear plates for dividing the annular damping volume in a main and a secondary volume; and a plurality of intermediate drain holes passing the intermediate circumferential plate and configured for draining collected liquid from the main volume to the secondary volume.

13 Claims, 4 Drawing Sheets

(51) Int. Cl.
    *F23M 20/00*     (2014.01)
    *F23R 3/50*     (2006.01)
    *F02C 3/04*     (2006.01)

(52) U.S. Cl.
    CPC ............ *F02C 3/04* (2013.01); *F05D 2220/32* (2013.01); *F05D 2240/35* (2013.01); *F05D 2260/963* (2013.01); *F23R 2900/00014* (2013.01)

(56) References Cited

U.S. PATENT DOCUMENTS

| | | | |
|---|---|---|---|
| 10,267,523 B2 * | 4/2019 | Metternich | ............... F23R 3/18 |
| 2005/0229581 A1 | 10/2005 | Bellucci et al. | |
| 2015/0000282 A1 | 1/2015 | Genin et al. | |
| 2015/0113990 A1 | 4/2015 | Eroglu | |
| 2016/0003162 A1 * | 1/2016 | Beck | ........................ F23R 3/002 60/725 |
| 2016/0076772 A1 * | 3/2016 | Metternich | ............... F23R 3/18 60/772 |
| 2017/0219207 A1 * | 8/2017 | Liu | ........................ G10K 11/172 |

FOREIGN PATENT DOCUMENTS

| | | | |
|---|---|---|---|
| EP | 2642203 A1 | 9/2013 | |
| EP | 2 828 579 | 1/2015 | |
| WO | WO-2014131876 A1 * | 9/2014 | .............. F23R 3/002 |
| WO | WO-2016057186 A1 * | 4/2016 | ........... G10K 11/172 |

OTHER PUBLICATIONS

First Office Action dated Mar. 11, 2020, by the Chinese Patent Office in corresponding Chinese Patent Application No. 201710865544.8, and an English Translation of the Office Action. (17 pages).

* cited by examiner

ANNULAR HELMHOLTZ DAMPER FOR A GAS TURBINE CAN COMBUSTOR

PRIORITY CLAIM

This application claims priority from European Patent Application No. 16190213.5 filed on Sep. 22, 2016, the disclosure of which is incorporated by reference.

FIELD OF THE INVENTION

The present invention relates to a damper for a gas turbine. In particular, the present invention relates to an annular Helmholtz damper for a gas turbine can combustor configured to damp pressure oscillations that are generated during operation of the gas turbine.

DESCRIPTION OF PRIOR ART

Gas turbines are provided with one or more combustion chambers, wherein a fuel is injected, mixed to an air flow and burnt, to generate high pressure gas that is expanded in a turbine.

During operation, inside the combustion chambers pressure oscillations may be generated that could cause mechanical damages and limit the operating regime. Nevertheless, frequency of these pressure oscillations may slightly change from gas turbine to gas turbine and, in addition, also for the same gas turbine it may slightly change during gas turbine operation (for example part load, base load, transition etc.).

Mostly gas turbines have to operate in lean mode for compliance to pollution emissions. The burner flame during this mode of operation is extremely sensitive to flow perturbations and can easily couple with dynamics of the combustion chamber to lead to thermo-acoustic instabilities. For this reason, usually combustion chambers are provided with damping devices, such as quarter wave tubes, Helmholtz dampers or acoustic screens, in order to damp these pressure oscillations.

A traditional Helmholtz damper includes a damping volume that acts as a resonator volume and a neck fluidly connected to the combustion chamber. As explained above, the pressure oscillations generated due to the combustion need to be damped.

The resonance frequency (i.e. the damped frequency) of the Helmholtz damper depends on the geometrical features of the resonator volume and neck and must correspond to the frequency of the pressure oscillations generated in the combustion chamber. In particular, the resonator volume and neck geometry determine the Eigenfrequency of the Helmholtz damper. The maximum damping characteristics of the Helmholtz damper is achieved at the Eigenfrequency and it is typically in a very narrow frequency band.

Normally, since the Helmholtz dampers are used to address low frequency range pressure pulsations (50-500 Hz), the volume size of the Helmholtz damper increases. In some cases the volume of Helmholtz damper may even be comparable to combustor chamber size. Moreover, in order to damp pressure oscillations in a sufficiently large bandwidth, multiple Helmholtz dampers need to be connected to the combustion chamber.

Common Helmholtz dampers are connected to the front panel wall of the combustion chamber. However, as there is limited space on such front panel wall, this kind of for installation is not possible for Helmholtz damper with high volume size.

Today is known another kind of Helmholtz damper installation wherein the damping volume is arranged around the combustion chamber. This kind of installation is suitable for can combustors wherein the inner wall of the Helmholtz damper consists in the combustor wall. In view of the disposition around the can combustor, this kind of Helmholtz dampers are called "annular" dampers.

According to the prior art, an annular Helmholtz damper can be provided with multiple annular volumes interconnected in series along the axis of the can combustor in order to damp a large frequency band of. The main volume, provided with the main neck fluidly connected to the combustion chamber, and the additional volume are separated by a circumferential plate provided with a plurality of intermediate necks.

The rear wall of common annular Helmholtz dampers comprises a plurality of passing purge holes positioned opposite to the main neck. Indeed, in order to prevent hot gas ingestion, purge air enters the damper volumes through the purge holes and exits through the main neck.

As explained above, the volume of the dampers for gas turbine is large for low frequency damping. In parallel, the risk of considerable amount of liquid collection within such damping volume increases. If the amount of the liquid collected inside the damper exceeds a certain percentage of the damper volume, the damper cannot work anymore with high efficiency until the liquid is evaporated. Additionally, if the liquid collected inside the damper contains fuel, there is a risk of deflagration inside the damper volume during start-up of the gas turbine.

SUMMARY OF THE INVENTION

Accordingly, a primary object of the present invention is to provide an annular Helmholtz damper for a gas turbine can combustor that allow to reduce the risk of collecting liquid (possibly containing fuel) inside the damper with a faster evaporation of the remaining liquid.

In order to achieve the objective technical problem mentioned above, the present invention provides an annular Helmholtz damper for a gas turbine can combustor wherein the annular damper has an axis and comprises:

an inner wall and an outer wall concentrically arranged with respect to the axis in order to define an annular damping volume arranged around the can combustor; preferably the damper inner wall consists at least in part in the combustor chamber wall and, consequently, the damper is an integral part of the casing surrounding a cannular hot gas path;

a front circumferential plate and a rear circumferential plate for closing upstream and downstream the annular damping volume;

at least one intermediate circumferential plate arranged between the front and the rear plates for dividing the annular damping volume in a main volume and in at least a secondary volume.

The terms "inner" and "outer" refer to the damper axis that corresponds to the can combustor axis. The terms "front/upstream" and "rear/downstream" refer to the main flow of the hot gas passing through the can combustor. The annular damper also comprises:

at least one main neck passing the inner wall and configured for fluidly connecting the main volume with the combustion chamber of the can combustor;

at least one intermediate neck passing through the intermediate circumferential plate configured for connecting the main volume with the secondary volume; and a plurality of purge holes passing the rear circumferential plate configured for purge air to enter into the secondary volume.

The main neck connects the main annular volume to the turbine hot gas path in order to damp a specific pulsation frequency. The intermediate neck connects the secondary annular damper volume to the main damper volume in order to increase the range of damped pulsation frequencies.

Purge air enters the damper volumes through the purge holes and exits through the main neck in order to prevent hot gas ingestion.

According to a first aspect of the invention, the annular Helmholtz damper comprises a plurality of intermediate drain holes passing the intermediate circumferential plate.

Advantageously, the intermediate drain holes arranged as above described allow to reduce the fluid collection by draining such collected liquid from the main volume to the secondary volume wherein the fluid can flow out from the damper passing through the purge holes.

According to a second aspect of the invention, the annular Helmholtz damper comprises a plurality of by-pass purge holes passing through the front circumferential plate.

Advantageously, the by-pass purge holes, arranged as above described, also act as drain holes to reduce the fluid collection possible by draining such collected liquid outside from the main volume passing through the by-pass purge holes.

The presence of such by-pass purge holes can also be independent with respect the present of the intermediate drain holes. Indeed, the intermediate drain holes are configured to draining the fluid from the main to the secondary volume Of course, the simultaneously presence of the by-pass purge holes and the intermediate drain holes allow the damper of the present invention to be more efficient in a plurality of assembly conditions.

In particular, the intermediate drain holes and the purge holes are arranged outwardly the respective intermediate and rear circumferential plate.

Advantageously, the radially outwards position of the purge and intermediate drain hole allow to minimize the level of fluid collected in the damper. Preferably, the purge holes are arranged uniformly around the entire circumference of the relative plate.

In particular, the damper comprises a plurality of intermediate necks and the by-pass purge holes and the intermediate necks are arranged outwardly the respective intermediate and front circumferential plate.

Advantageously, the radially outwards position of the intermediate necks and by-pass purge hole allow to minimize the level of fluid collected in the damper. Preferably, the by-pass purge holes are arranged uniformly around the relative plate and at least part of such holes are aligned with the intermediate necks.

In particular, the intermediate necks are uniformly arranged along a first half of the intermediate circumferential plate and the intermediate drain holes are uniformly arranged along the opposite second half of the intermediate circumferential plate.

Advantageously, the intermediate necks can act as draining passage in a plurality of assembly conditions.

In particular, the outer wall is straight and the inner wall comprises a step at the passage from the main volume to the secondary volume so the distance between the inner and outer wall is higher at the main volume than at the secondary volume. The diameter of the intermediate necks substantially corresponds to the distance between the inner and outer wall at the secondary volume.

Advantageously, in a plurality of assembly conditions the liquid collected in the secondary volume can totally flow out passing through the intermediate necks.

The dimensions of the main and intermediate necks, as the dimension of the main and secondary volumes, have to be calculated depending on the pulsation frequency range to be damped.

It is well known that the damper will have best damping effect when it is close to the pulsation maximum of the standing wave pattern in combustion chamber. The resonance frequency of a traditional Helmholtz damper is given by:

$$Fn = (C/2\pi) * \sqrt{An/V*Ln}$$

where Fn is the resonance frequency of damper, An is the area of neck, V is the volume of resonator in the damper, Ln is the length of neck. C is the mean speed of sound of fluid inside the damper.

More details referring to structural and functional features of a Helmholtz damper are disclosed, for instance, in EP2828579.

The present invention refers also to a combustor can provided with the damper as foregoing described. Indeed, preferably the damper is integral with the can combustor because the inner wall consists in the combustor chamber wall. The damper can disclose the same length along the axis than the can combustor. Finally, the present invention refers also to a gas turbine energy plant comprising a plurality of can combustors provided with the described annular Helmholtz dampers.

It is to be understood that both the foregoing general description and the following detailed description are exemplary, and are intended to provide further explanation of the invention as claimed. Other advantages and features of the invention will be apparent from the following description, drawings and claims.

The features of the invention believed to be novel are set forth with particularity in the appended claims.

BRIEF DESCRIPTION OF DRAWINGS

Further benefits and advantages of the present invention will become apparent after a careful reading of the detailed description with appropriate reference to the accompanying drawings.

The invention itself, however, may be best understood by reference to the following detailed description of the invention, which describes an exemplary embodiment of the invention, taken in conjunction with the accompanying drawings, in which.

DETAILED DESCRIPTION OF THE INVENTION

In cooperation with attached drawings, the technical contents and detailed description of the present invention are described thereinafter according to preferable embodiments, being not used to limit its executing scope. Any equivalent variation and modification made according to appended claims is all covered by the claims claimed by the present invention.

Reference will now be made to the drawing figures to describe the present invention in detail.

Figure 1:
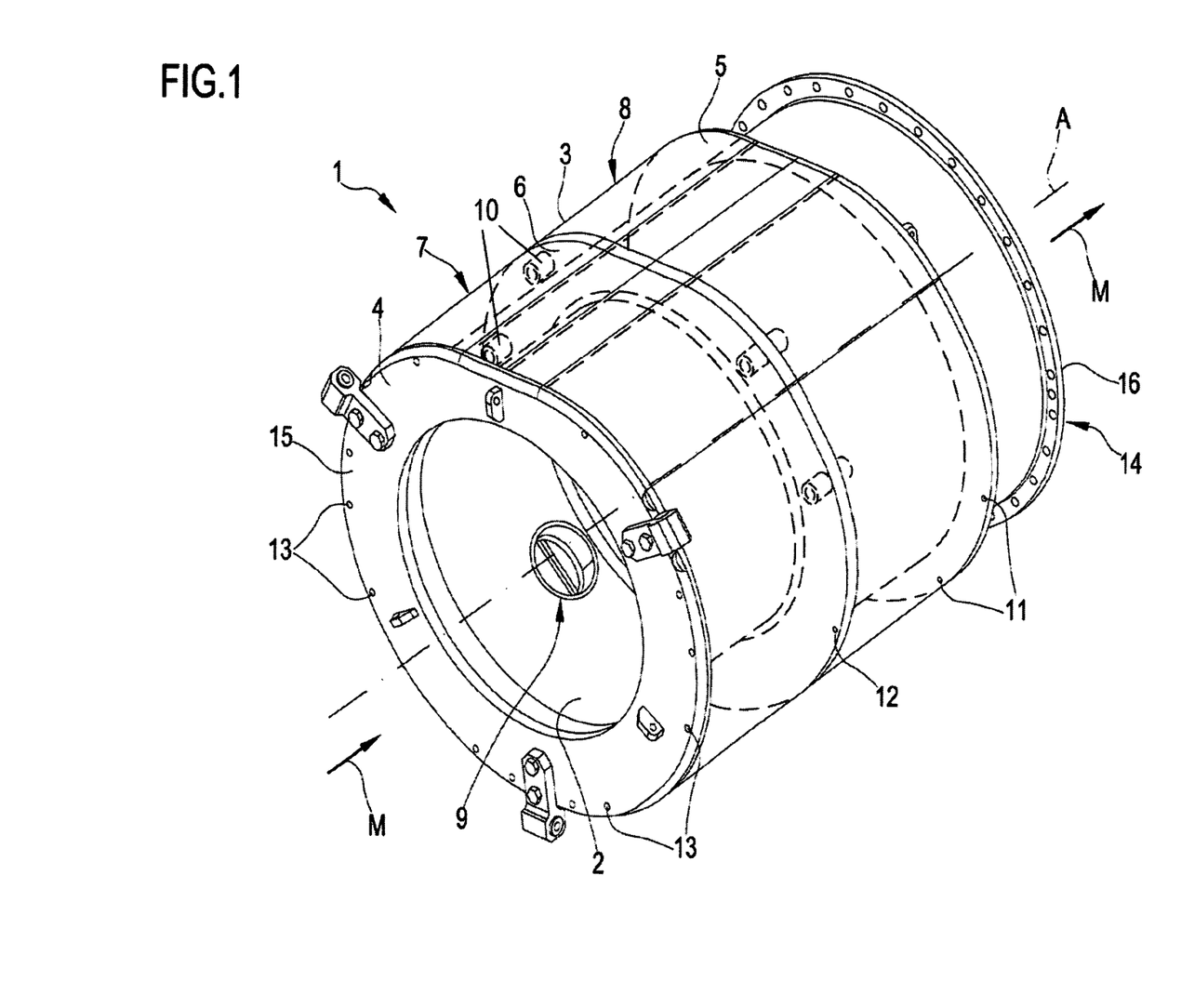
FIG. 1 is a prospective schematic view of an embodiment of an annular Helmholtz damper for a gas turbine can combustor according to the invention.

Reference is made to FIG. 1 that is a schematic prospective view of an annular Helmholtz damper according to the invention realized integral with the relevant can combustion. In particular, FIG. 1 discloses a can combustor 14 having an upstream end 15 and a downstream end 16. The terms "upstream" and "downstream" refers to the main flow of the hot gas represented in FIG. 1 by the arrow M. The can combustor 14 has been schematically represented only by a cylinder having a wall 2. The combustion chamber corresponds to the inner volume inside such cylindrical wall 2. According to this embodiment, around the combustion chamber the can combustor 14 is provided with an annular Helmholtz damper 1 wherein the combustor wall 2 corresponds to the damper inner wall 2.

Such damper 1 can be called as an "annular" damper because the damping volume is defined by the above inner wall 2 and an outer wall 3 concentrically arranged with respect to the axis A around the can combustor.

In the embodiment of FIG. 1, the annular Helmholtz damper 1 is shorter along the axis A than the relative can combustor 14. However, the annular Helmholtz damper 1 according the invention can also disclose a length equal than the can combustor 14.

The annular Helmholtz damper 1 comprises a front upstream circumferential plate 4 and a rear downstream circumferential plate configured for closing upstream and downstream the annular damping volume. According to the embodiment of FIG. 1, the front upstream circumferential plate 4 corresponds to the upstream end 15 of the can combustor 14.

In FIG. 1 the outer wall 3 has been represented "see-through" in order to disclose an intermediate circumferential plate 6 arranged between the front and the rear plates 4, 5. This intermediate circumferential plate 6 is configured for dividing the annular damping volume in two sub volumes in series, namely a main volume 7 and a secondary volume 8. According to the embodiment of FIG. 1, the damper 1 comprises only one intermediate circumferential plate 6. However, the damper 1 can comprise more than one intermediate circumferential plate 6 in order to obtain a plurality of secondary volume 8 in series arranged each other and also with respect to the main volume 7.

The main volume 7 is fluidly connected to the combustion chamber trough a main neck 9 passing the inner wall 2. According to the embodiment of FIG. 1, the damper 1 comprises only one main neck 9. However, the damper 1 can comprise more than one main neck 9.

The intermediate circumferential plate 6 is provided with a plurality of intermediate necks 10 configured for fluidly connecting the main volume 7, upstream the intermediate circumferential plate 6, with the secondary volume 8 downstream the intermediate circumferential plate 6. According to the embodiment of FIG. 1, the damper 1 comprises four intermediate necks 10. However, the damper 1 can comprise less or more than four intermediate necks 10 arranged along a part of along the entire length of the intermediate circumferential plate 6.

The rear circumferential plate 5 comprises a plurality of purge holes 11 configured for entering purge air in the secondary volume 8. This purge air flows through the main neck 9 in order to avoid hot gas ingestion inside the damper 1. According to the embodiment of FIG. 1, the damper 1 discloses two purge holes 11. However, the damper 1 can comprise more than two purge holes 11 arranged along a part of along the entire length of the rear circumferential plate 5. Outside the damper 1 the purge holes 11 are facing an outer plenum.

As known, the purge holes 11, as the other holes that will be described in the following, do not comprise any projecting necks, as the main and the intermediate necks 10, and consist only in through holes. In addition, the dimensions of these holes are very different from the dimensions of the necks. For instance, the holes can disclose a diameter equal to about 3 mm whereas the main neck a diameter equal to about 30 mm and the intermediate necks 10 a diameter equal to about 10 mm.

The intermediate circumferential plate 6 is also provided with a plurality of intermediate drain holes 12 configured for draining collected liquid from the main volume 7 to the secondary volume 8. According to the embodiment of FIG. 1, the intermediate drain holes 12 are arranged along a first half of the intermediate circumferential plate 6 and the intermediate necks 10 along the opposite half. However, both the intermediate necks 10 and the intermediate drain holes 12 can be arranged along the entire length of the intermediate circumferential plate 6.

The front circumferential plate 4 is provided with a plurality of by-pass purge holes 13 configured for draining collected liquid outside the main volume 7. According to the embodiment of FIG. 1, the by-pass purge holes 13 are arranged along the entire length of the front circumferential plate 4. However, by-pass purge holes 13 can be arranged only along half of the front circumferential plate 4.

Figure 2:
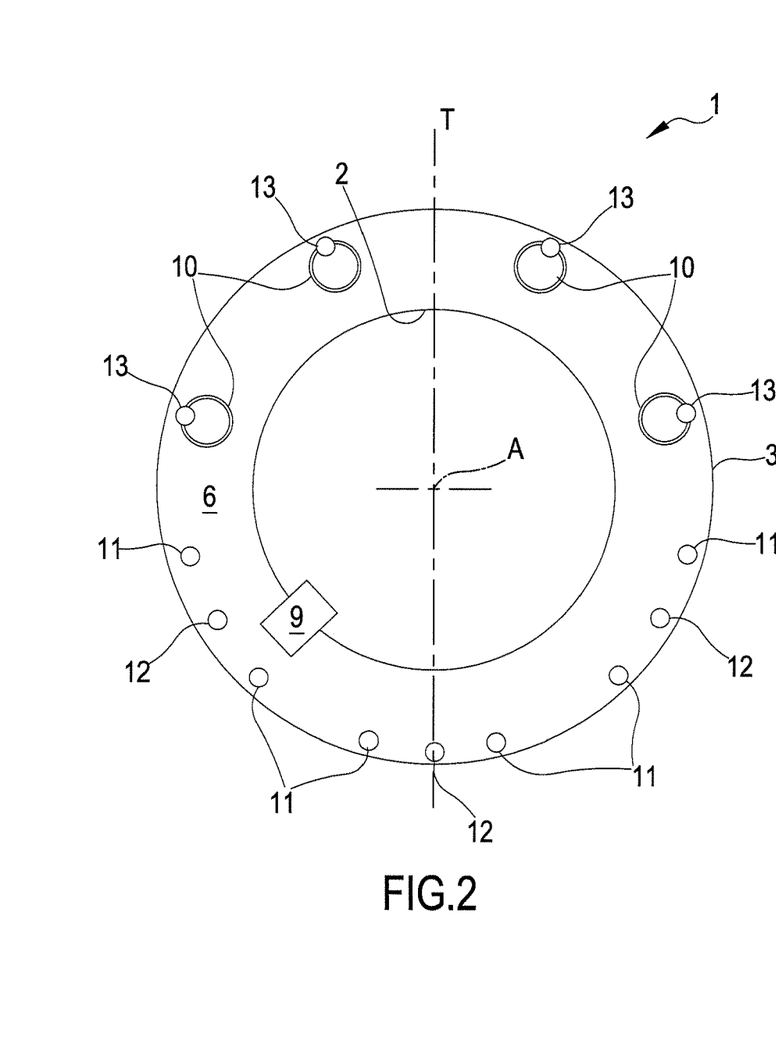
FIG. 2 is a schematic view of a circumferential distribution of the holes and the necks in an annular Helmholtz damper for a gas turbine can combustor according to the invention.

Reference is made to FIG. 2 that is a schematic view of a circumferential distribution of the holes and the necks according to an embodiment of the invention.

In particular, FIG. 2 discloses a projection of all holes and necks on the upstream surface of the intermediate circumferential plate 6 according to a preferred embodiment of the invention. The axis T disclosed in FIG. 2 corresponds to the axis passing through the center of the can combustor and to the center of the gas turbine.

According to the embodiment of FIG. 2, the intermediate drain holes 12 and the purge holes 11 are arranged outwardly the respective plate 5, 6. In addition, the by-pass purge holes 13 and the intermediate necks 10 are arranged outwardly the respective plate 4, 6 and are aligned each other.

According to this embodiment, the intermediate necks 10 are arranged only along a first half of the intermediate circumferential plate 6 and the intermediate drain holes 12 are arranged along the opposite second half of the same intermediate circumferential plate 6. The projection of the purge holes 11 is arranged in the same second half of the same intermediate circumferential plate 6 wherein also the projection of the main neck 9 is present.

Figure 3:
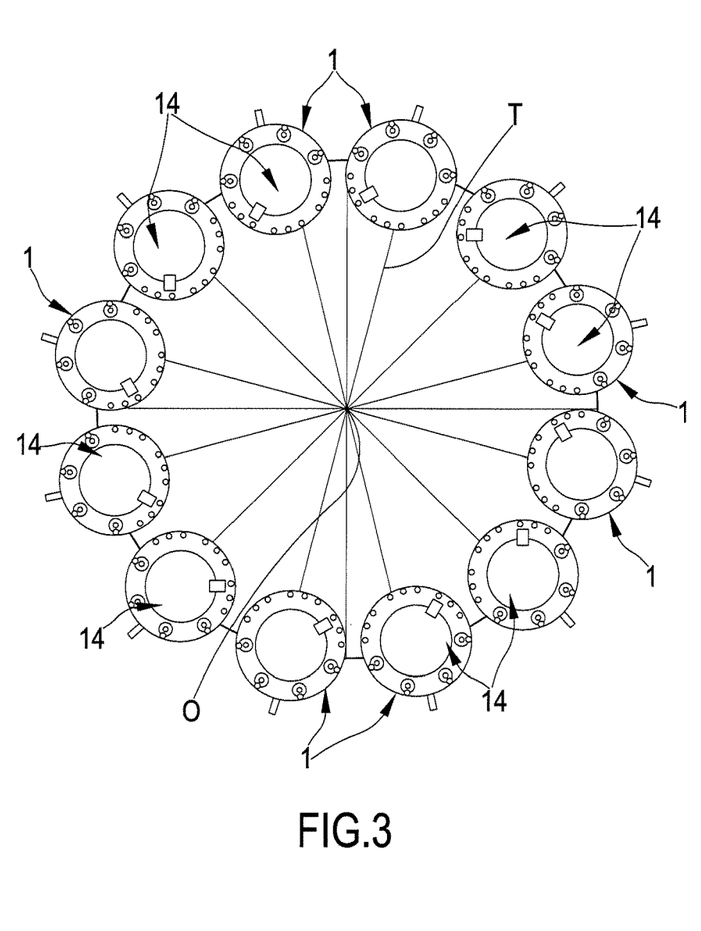
FIG. 3 is a schematic view of a circumferential distribution of the annular Helmholtz dampers about the gas turbine axis.

Reference is made to FIG. 3 that is a schematic view of the circumferential distribution of the annular Helmholtz dampers 1 about the gas turbine axis. In particular, each damper 1 is arranged like a clock with respect to the gas turbine axis in order to maintain the holes and necks distribution above described fixed with respect to the axis T passing through the center of the combustor can and to the center O of the gas turbine.

Reference is made to FIGS. 4-9 that are schematic comparisons between an annular Helmholtz damper 1 according to the invention, i.e. preferably provided with both the intermediate drain holes 12 by-pass purge holes 13 as foregoing described, and an annular Helmholtz damper according to the prior art in different assembly positions of the damper.

Figure 4:
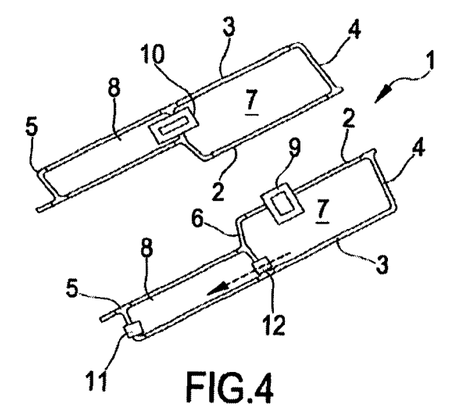
FIGS. 4-9 are schematic comparisons between an annular Helmholtz damper according to the invention and an annular Helmholtz damper according to the prior art in different assembly positions.
Figure 5:
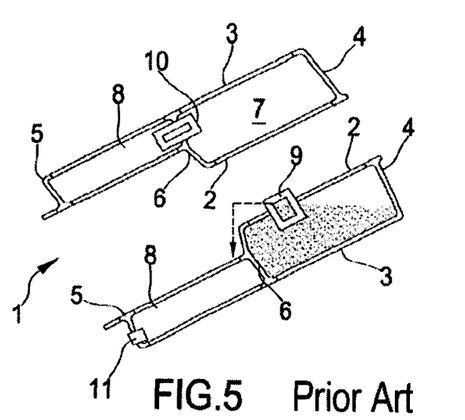

In particular, FIGS. 4 and 5 disclose an assembly position of the damper 1 wherein the damper is inclined to flow the liquid collected in the main volume 7 towards the rear circumferential plate 5.

According to the prior art (FIG. 5), the intermediate circumferential plate 6 is not provided with any intermediate drain holes 12. Therefore, the liquid collected in the main volume 7 can flow only in part outside the damper passing through the main neck 9.

According to the invention (FIG. 4), the intermediate circumferential plate 6 is provided with intermediate drain holes 12. Therefore, the liquid collected in the main volume 7 can freely flow through the intermediate drain holes 12 and goes outside the damper passing through the purge holes 12.

Figure 6:
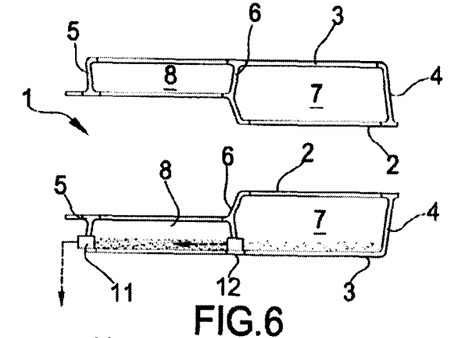
Figure 7:
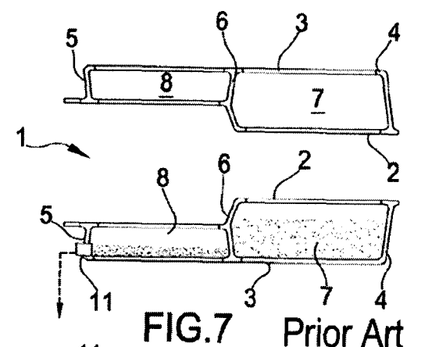

In particular, FIGS. 6 and 7 disclose an assembly position of the damper 1 wherein the damper is horizontal and orthogonal to the gravity direction.

According to the prior art (FIG. 7), the intermediate circumferential plate 6 is not provided with any intermediate drain holes 12. Therefore, the liquid amount collected in the main volume 7 is more than the liquid amount collected in the secondary volume 8 provided with the purge holes 12.

According to the invention (FIG. 6), the intermediate circumferential plate 6 is provided with intermediate drain holes 12. Therefore the main part of the liquid collected in the main volume 7 can freely flow through the intermediate drain holes 12 and goes outside the damper passing through the purge holes 12.

Figure 8:
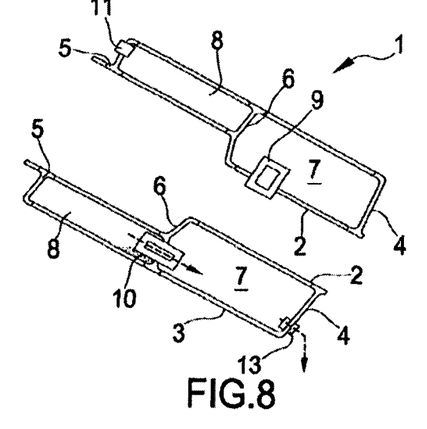
Figure 9:
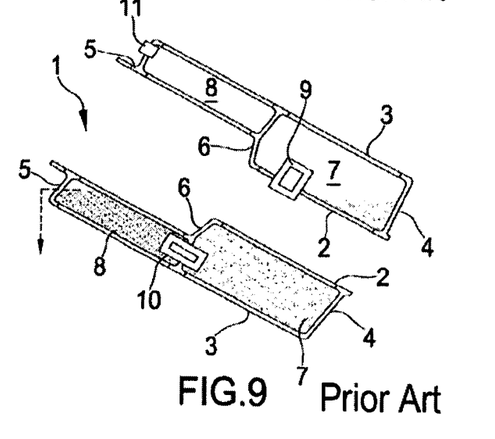
Figure 10:
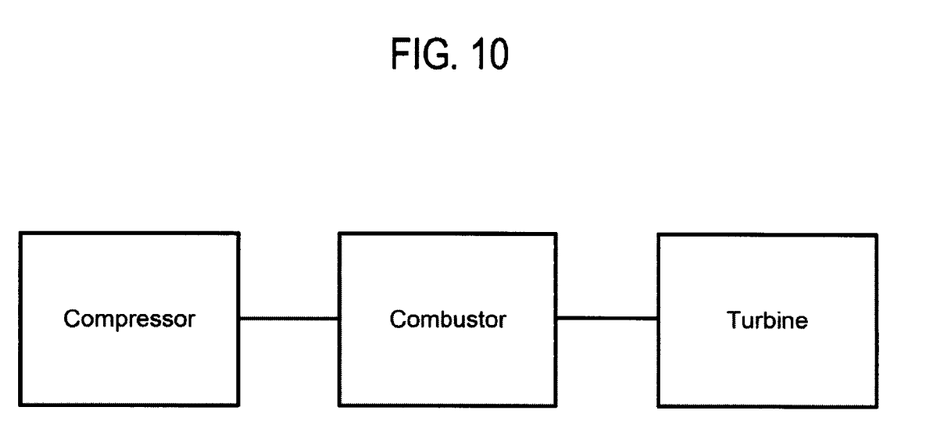
FIG. 10 is a schematic of a gas turbine.

In particular, FIGS. 8 and 9 disclose an assembly position of the damper wherein the damper is inclined to flow the liquid collected in the main volume 7 toward the front circumferential plate 4.

According to the prior art (FIG. 9), the front circumferential plate 4 is not provided with by-pass purge holes 13. Therefore, the liquid collected in the main 7 and in the secondary volume 8 is fully blocked inside the damper.

According to the invention (FIG. 8), the front circumferential plate 4 is provided with by-pass purge holes 13. Therefore, the liquid collected in the main volume 7 can freely flow through by-pass purge holes 13 and the liquid collected in the secondary volume 8 can freely pass through the intermediate necks 10 and flow out through by-pass purge holes 13.

According to the FIG. 4-9, the outer wall 3 is straight and the inner wall 2 comprises a step at the passage from the main volume 7 to the secondary volume 8 so that the distance between the inner and outer wall 2, 3 is more at the higher volume 7 than at the secondary volume 8. However, the secondary volume 8 can disclose the same height than the main volume 7.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. An annular Helmholtz damper for a gas turbine can combustor, the annular Helmholtz damper comprising:
   an axis (A);
   an inner wall and an outer wall concentrically arranged with respect to the axis (A) to define an annular damping volume arranged around a can combustor;
   a front circumferential plate and a rear circumferential plate for closing the annular damping volume upstream and downstream;
   at least one intermediate circumferential plate arranged between the front and the rear circumferential plates for dividing the annular damping volume in a main volume and in at least a secondary volume;
   at least one main neck passing through the inner wall and configured for fluidly connecting the main volume with the can combustor chamber;
   at least one intermediate neck passing through the intermediate circumferential plate configured for fluidly connecting the main volume with the secondary volume;
   a plurality of purge holes passing through the rear circumferential plate and configured for entering purge air in the secondary volume; and
   a plurality of intermediate drain holes passing through the intermediate circumferential plate and configured for draining collected liquid from the main volume to the secondary volume wherein the intermediate drain holes each have a diameter that is different than a diameter of the at least one intermediate neck,
   wherein the at least one intermediate neck is only arranged along a first circumferential half of the intermediate circumferential plate and the plurality of intermediate drain holes are only arranged along a second circumferential half of the intermediate circumferential plate opposite the first circumferential half.

2. The annular Helmholtz damper as claimed in claim 1, comprising:
   a plurality of by-pass purge holes passing through the front circumferential plate and configured for draining collected liquid outside the main volume.

3. The annular Helmholtz damper as claimed in claim 1, wherein the intermediate drain holes and the purge holes are arranged outwardly through the intermediate and rear circumferential plates, respectively.

4. The annular Helmholtz damper as claimed in claim 2, comprising:
   a plurality of intermediate necks; the by-pass purge holes and the intermediate necks being arranged outwardly through the front circumferential plate and the intermediate plate, respectively.

5. The annular Helmholtz damper as claimed in claim 4, wherein by-pass purge holes and the intermediate necks are aligned.

6. The annular Helmholtz damper as claimed in claim 1, wherein the outer wall is straight and the inner wall comprises:
   a step at a passage from the main volume to the secondary volume so that a distance between the inner and outer walls is higher at the main volume than at the secondary volume.

7. A gas turbine comprising:
   an axis (O);
   a compressor;
   a combustor; and
   a turbine, the combustor having a plurality of can combustors circumferentially arranged around the gas turbine axis (O), each can combustor being provided with an annular Helmholtz damper, each annular Helmholtz damper having:

an axis (A);

an inner wall and an outer wall concentrically arranged with respect to the axis (A) to define an annular damping volume arranged around a can combustor;

a front circumferential plate and a rear circumferential plate for closing the annular damping volume upstream and downstream;

at least one intermediate circumferential plate arranged between the front and the rear circumferential plates for dividing the annular damping volume in a main volume and in at least a secondary volume;

at least one main neck passing through the inner wall and configured for fluidly connecting the main volume with the can combustor chamber;

at least one intermediate neck passing through the intermediate circumferential plate and configured for fluidly connecting the main volume with the secondary volume;

a plurality of purge holes passing through the rear circumferential plate and configured for entering purge air in the secondary volume; and a plurality of intermediate drain holes passing through the intermediate circumferential plate and configured for draining collected liquid from the main volume to the secondary volume wherein the intermediate drain holes each have a diameter that is different than a diameter of the at least one intermediate neck, wherein the at least one intermediate neck is only arranged along a first circumferential half of the intermediate circumferential plate and the plurality of intermediate drain holes are only arranged along a second circumferential half of the intermediate circumferential plate opposite the first circumferential half.

8. The gas turbine as claimed in claim 7, wherein the annular Helmholtz damper comprises:

a plurality of by-pass purge holes passing through the front circumferential plate and configured for draining collected liquid outside the main volume.

9. The gas turbine as claimed in claim 7, wherein the intermediate drain holes and the purge holes are arranged outwardly through the intermediate and rear circumferential plates, respectively.

10. The gas turbine as claimed in claim 8, comprising:

a plurality of intermediate necks; the by-pass purge holes and the intermediate necks being arranged outwardly through the front circumferential plate and the intermediate plate, respectively.

11. The gas turbine as claimed in claim 10, wherein by-pass purge holes and the intermediate necks are aligned.

12. The gas turbine as claimed in claim 7, wherein the outer wall is straight and the inner wall comprises:

a step at a passage from the main volume to the secondary volume so that a distance between the inner and outer walls is higher at the main volume than at the secondary volume.

13. The gas turbine as claimed in claim 7, wherein the annular Helmholtz damper has a same length as a can combustor.

* * * * *